(12) United States Patent
Bassi

(10) Patent No.: US 11,679,451 B2
(45) Date of Patent: Jun. 20, 2023

(54) SYSTEM AND METHOD FOR MONITORING DIRECT PART MARKING (DPM) PROCESSES AND GENERATING VISUAL NOTIFICATIONS ON PARTS FOR OPERATORS

(71) Applicant: Datalogic IP Tech S.R.L., Calderara di Reno (IT)

(72) Inventor: Lorenzo Bassi, Calderara di Reno (IT)

(73) Assignee: Datalogic IP Tech S.r.l., Calderara di Reno (IT)

(*) Notice: Subject to any disclaimer, the term of this patent is extended or adjusted under 35 U.S.C. 154(b) by 0 days.

(21) Appl. No.: 16/965,954

(22) PCT Filed: Jan. 28, 2019

(86) PCT No.: PCT/IB2019/000100
§ 371 (c)(1),
(2) Date: Jul. 29, 2020

(87) PCT Pub. No.: WO2019/145789
PCT Pub. Date: Aug. 1, 2019

(65) Prior Publication Data
US 2021/0086523 A1 Mar. 25, 2021

Related U.S. Application Data

(60) Provisional application No. 62/623,164, filed on Jan. 29, 2018.

(51) Int. Cl.
*B41J 2/44* (2006.01)
*B41J 2/47* (2006.01)
(Continued)

(52) U.S. Cl.
CPC .......... *B23K 26/364* (2015.10); *B23K 26/082* (2015.10); *B23K 26/359* (2015.10);
(Continued)

(58) Field of Classification Search
CPC ... B41J 2/442; B41J 2/47; B41J 2/475; B41M 5/24; B41M 5/262; B41M 5/267; B23K 26/032; B23K 26/082; B23K 26/364
See application file for complete search history.

(56) References Cited

U.S. PATENT DOCUMENTS 6,066,829 A * 5/2000 Ishikawa ................ B23K 26/02
219/121.68
7,915,564 B2 * 3/2011 Kaplan ................ B23K 26/043
219/121.68
(Continued)

FOREIGN PATENT DOCUMENTS

| EP | 2 435 888 A1 | 4/2012 |
| JP | 2009-208132 A | 9/2009 |
| WO | WO-2017/007492 A1 | 1/2017 |

OTHER PUBLICATIONS

Int'l. Pat. Appl. No. PCT/IB2019/000100, International Search Report and Written Opinion dated Aug. 20, 2019, 8 pgs.
(Continued)

*Primary Examiner* — Christopher E Mahoney
*Assistant Examiner* — Kendrick X Liu
(74) *Attorney, Agent, or Firm* — Foley & Lardner LLP

(57) ABSTRACT

A system and method for performing laser marking may include identifying an event performed by a laser marking system. A laser marking unit may be driven to mark the feature on the part. The part may be illuminated with a visible illumination signal to indicate an occurrence of the event in response to identifying the event.

18 Claims, 11 Drawing Sheets

(51) Int. Cl.
*B41J 2/475* (2006.01)
*B41M 5/24* (2006.01)
*B41M 5/26* (2006.01)
*B23K 26/03* (2006.01)
*B23K 26/082* (2014.01)
*B23K 26/364* (2014.01)
*B23K 26/359* (2014.01)

(52) U.S. Cl.
CPC .................. *B41J 2/442* (2013.01); *B41J 2/47* (2013.01); *B41J 2/475* (2013.01); *B41M 5/24* (2013.01); *B41M 5/262* (2013.01); *B41M 5/267* (2013.01)

(56) References Cited

U.S. PATENT DOCUMENTS

2007/0289956 A1* 12/2007 Knysh .............. G05B 19/41815
219/121.68
2012/0074107 A1 3/2012 Berthe et al.

OTHER PUBLICATIONS

Chinese Patent Appl. No. 201980016811.1, First Office Action dated Feb. 28, 2022, 20 pgs.

* cited by examiner

SYSTEM AND METHOD FOR MONITORING DIRECT PART MARKING (DPM) PROCESSES AND GENERATING VISUAL NOTIFICATIONS ON PARTS FOR OPERATORS

CROSS REFERENCE TO RELATED APPLICATIONS

This application is a 371 National Stage Application of International Application No. PCT/IB2019/000100, filed Jan. 28, 2019, which claims the benefit of US Provisional Application No. 62/623,164, filed Jan. 29, 2018, which is incorporated herein by reference in its entirety.

FIELD OF THE INVENTION

The present invention relates to laser marking features, such as symbols, graphics, text, and texturing, on parts of objects, and illuminating a visual indicator on the part to indicate to an operator or otherwise an occurrence of an event of the laser marking process in response to identifying the event.

BACKGROUND OF THE INVENTION

Manufacturing parts in a production environment is a challenge from a speed and quality standpoint. Some production equipment is fully automated and some is more manual depending upon the parts that are being produced and the material used for the production. In many cases, parts are handled by humans to some extent to lead and unload onto production equipment for some cases, production of parts include direct part marking (DPM) surface(s) of the parts with codes or symbols, text graphics, such as logos, or texturing. Lasers are generally used for the marking process, but other techniques may be utilized. The overall process of DPM marking during production becomes integral such that operators of DPM machinery become integral to the process.

In the specific case of direct part markings, the technique is often used to mark parts with machine-readable indicia or symbols that can be read during production, inspection, and/or logistics, for example. Text, graphics, or other features may also be marked (e.g., engraved or etched), into surfaces or parts using DPM techniques. Because of the importance of being able to track specific parts produced for inclusion in equipment, such as automobiles, airplanes, military equipment, for example, it is important that the DPM symbols formed on the parts are well formed (e.g., with sufficient contrast and with proper geometric shape) or readable (e.g., human readable or machine readable). If the DPM symbols are not easily or unable to be read, problems at different supply chain operations, such as staging, assembly, or otherwise, may result, thereby resulting in lost time, productivity, cost, possible machine failure, and/or risk to human lives.

For DPM, inline quality grading is used to perform verification of quality and readability by examining optical characteristics of the code according to industry standards and specifications, which are generally defined by an international organization, such as the ISO, and industry groups. By performing inline quality grading, parts that are printed with low-quality may be identified as being poorly marked and removed from a production line. Conventional quality grading is computed using a set of metrics, often nine or more metrics, that are given grades {A, B, C, D, F} or in an equivalent manner {4, 3, 2, 1, 0}, and then an overall grade is computed by being set to the lowest grade of all the metrics. The overall grade is used for accepting or rejecting the marked part based on the lowest grade of all the metrics measured during optical inspection.

Continuing with the DPM example, production equipment in which parts are produced and marked with DPM features, such as DPM symbols or text, are often manually operated to place the part into position for the marking and manually removed from the position after the marking is performed. As part of the inline quality grading, in response to the marking being graded, an external visual and/or audible indicator is generally produced to notify an operator that the DPM symbol was successful. The problem with conventional notifications is that the operator, especially in high-speed operations (e.g., one part per 10 seconds), loses sight and focus of the parts to verify that the DPM symbol was successfully created and read.

With other types of markings, such as branding graphics such as logos, text, and/or texturing, often those features have been marked or laser etched into a surface of a part, the parts are to be inspected to confirm that the markings were properly applied. Although tolerances may be less than those for DPM symbol markings with codes (e.g., QR code), quality standards are generally maintained to a certain extent. Accordingly, there is a need to provide operators with a more production-efficient way that part marking processes become more efficient including providing information to operators that the marking has been performed properly.

BRIEF SUMMARY OF THE INVENTION

To overcome the problem of inefficient or lack of notifications of a process for performing part laser markings, such as direct part marking (DPM) symbols, in production environments for operators of marking stations and the consequential increase of cycle time and reduction of productivity, a laser marking system may be configured to illuminate a visual indicator directly on a part during processing of the part and/or after confirming that a DPM feature has been marked. The visual notifications may be generated and illuminated on a part or near the part (e.g., on an adjacent surface), during a DPM process (e.g., machine preparing to mark, marking laser turned on, etc.). In an embodiment, a visual notification on or near the part being marked may be provided for the operator in response to inspecting a DPM feature, such as a DPM symbol. The visual notification may include determining that the DPM feature was correctly inspected from the part and determined to pass or fail a quality threshold. By imaging a visual indicator, such as an illumination signal with a certain wavelength (e.g., about 495 to about 570 nm; green) or color onto a part, an operator may see the visual indicator that indicates one or more events of the marking process (e.g., DPM marking process is completed or complete and compliant), and, optionally, that the marking process was successful in response to reading and verifying quality of the DPM marking. The visual indicator may additionally and/or alternatively include a human-readable symbol, such as text (e.g., a letter that indicates a quality value of the DPM feature). The visual indicator may be produced by a separate illumination element, such as a light emitting diode (LED) or other illumination device, that produces the visual indicator via at least a portion of an optical or light path of a laser marking unit or independent of the light path of the laser marking unit. In addition to the visual indicator conveying information to an operator that a DPM feature (e.g., DPM symbol was successfully applied and inspected), a visual indicator may provide instructions to an operator about quality of the symbol, what to do with the part next (e.g., "SCRAP" if the part failed inspection), and so on.

One embodiment of a direct part marking (DPM) system may include a laser marking unit configured to mark DPM features on parts using a laser, as understood in the art. An illumination unit may be configured to produce a visible structured illumination signal to be illuminated onto a part being marked with a DPM feature. A processing unit may be in communication with the laser marking unit and illumination unit, and be configured to control the laser marking unit to mark the part with the DPM feature, identify an event performed by the DPM system, and cause the illumination unit to illuminate the part with the visible illumination signal to indicate an occurrence of the event in response to identifying the event.

One embodiment of a method for performing direct part marking (DPM) may include identifying an event performed by the DPM system. A laser marking unit may be driven to mark the DPM feature on the part. The part may be illuminated with a visible illumination signal to indicate an occurrence of the event in response to identifying the event.

BRIEF DESCRIPTION OF THE DRAWINGS

Illustrative embodiments of the present invention are described in detail below with reference to the attached drawing figures, which are incorporated by reference herein and wherein.

DETAILED DESCRIPTION OF THE INVENTION

Figure 1C:
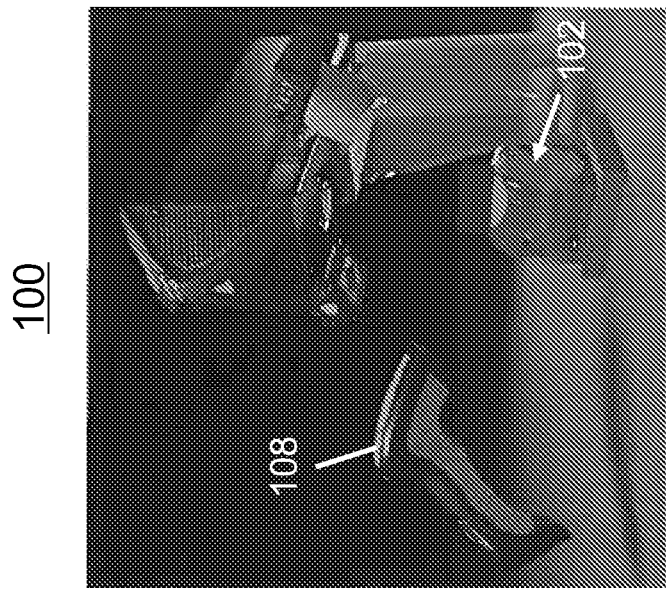
FIGS. 1A-1C are illustrations of an illustrative DPM marker and vision system to mark parts with DPM symbols, graphics, text or texturing and to read and verify the DPM symbols or otherwise marked on the parts.

In the present description, the term "DPM marking" is used interchangeably with "laser marking" to indicate a broad category of methods to leave or dispose marks on an object, which also includes color change due to chemical/molecular alteration, charring, foaming, melting, ablation, and more. The term "laser marking" is intended to include laser engraving and laser etching. As known in the art, DPM or laser marking apply to a number of materials such as metal, plastics, wood, and glass.

Manufacturing parts by a manufacturing line generally involves producing a part and applying DPM features, often using a DPM laser marker, to mark symbols, graphics, text, and/or texture to the parts, as understood in the art. DPM marking machines are typically operated by an operator placing a part or complete product onto a DPM machine for marking or conveyor of a DPM machine moving the part into a position to be marked. The machine has a number of phases or events, including "warming-up," "ready-to-work," "laser in position," "marking," and "marking complete." Depending on the configuration of the machine, the notification messages may be different for different machines. If, for example, a DPM marking machine has a moving axis (i.e., the part moves relative to a fixed laser, the laser moves relative to a fixed part, or a combination of part and laser moving simultaneously), the message of "laser in position" may indicate that the laser moved to a position to begin marking operations. While some DPM machines provide a status indicator on the machine itself, an operator of the machine tends to focus on the parts being manufactured as looking away from a part being processed by the machine can be distracting during production, thereby resulting in increased cycle times.

The principles described herein provide for a visual indicator to be illuminated on a part on which the DPM machine is processing. For example, during the events that occur when a DPM machine is operating (e.g., "warming-up," "ready-to-work," "marking," and "marking completed") a visual indicator may be illuminated onto the part or on a surface at which the part is placed to provide the operator with a visual indication of the phase or transition phase of the DPM machine. The visual indicator may be any type of visual illumination signal, such as a shape (e.g., circular, rectangular, triangular, arrow, or other shape), text (e.g., letter, word), etc. For example instruction words, such as "OK," "FAIL," "SCRAP," "MOVE UP/DOWN/LEFT . . . " "READY TO MOVE," "BATCH COMPLETE," etc., may be illuminated onto or near a part to provide instructions or guidance to the operator to aid in the marking process. The visual indicator may be illuminated onto a DPM marking or anywhere else on the part (e.g., a location on which a flaw (e.g., crack) is identified). The visual indicator may be any color (e.g., green, which is highly visible through protective laser windows), shape, size, state, or dynamic graphic that is used to provide the operator with visual information of the event or transition between events of the machine, as further provided herein.

Figure 1B:
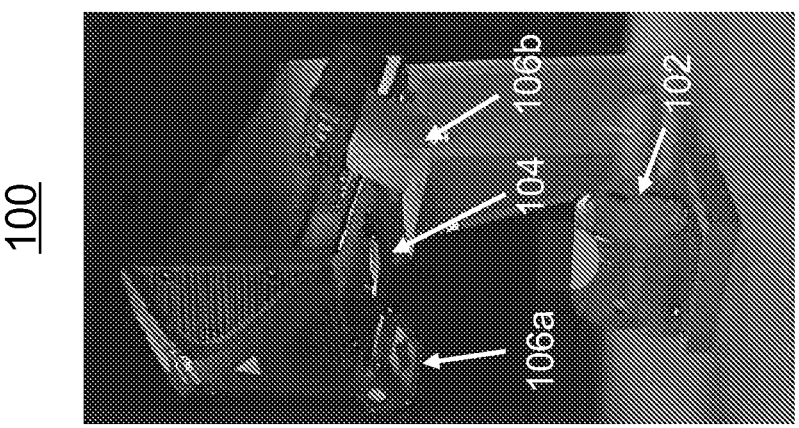
Figure 1A:
Figure 4:
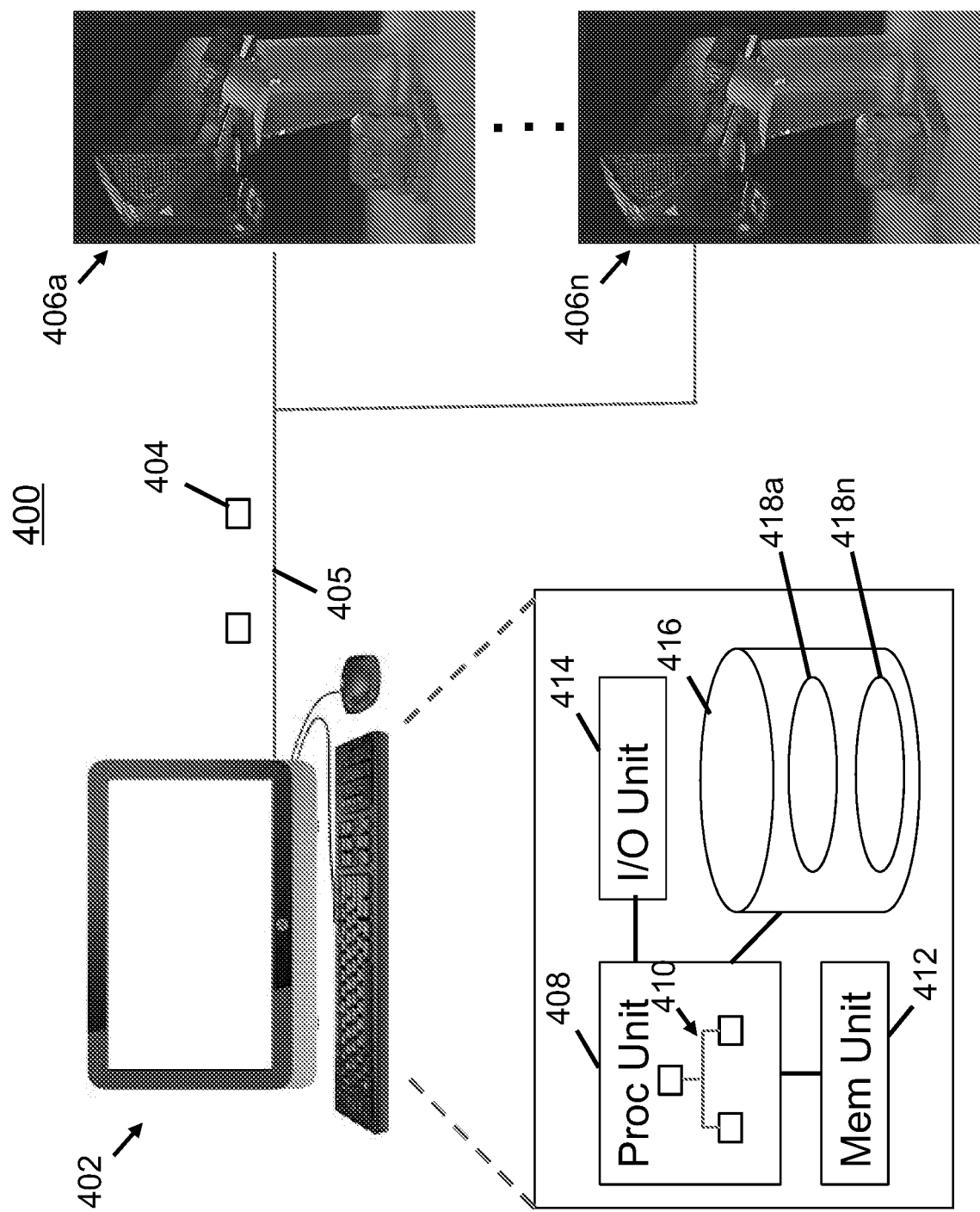
FIG. 4 is an illustration of an illustrative environment in which a computing system may be used during an inspection process of DPM markings on parts.

With regard to FIGS. 1A-1C, illustrations of an illustrative DPM marker and vision system 100 to mark surfaces of parts with DPM symbols (e.g., one-dimensional (1D) or two-dimensional (2D)) or other feature (e.g., graphics, text, and/or patterns), and to read and verify the DPM symbols marked on the surfaces of the parts are shown. The DPM symbols are typically inspected to confirm that the symbols can be optically read to ensure that the DPM symbols were properly marked (e.g., laser engraved or laser etched), and can be read by other readers in the future during other stages of a supply chain, production facility, and so forth. A visual inspection sub-system may be part of the system 100 or be independent thereof, and be used to visually inspect any marked feature applied to a part by a marker portion of the system 100. The visual inspection sub-system of the system 100 may be part of or define an independent inspection system, as further described herein. In an embodiment, the visual inspection sub-system may be a reader, and may be considered a barcode reader that is configured to read DPM symbols. The visual inspection sub-system may have an image sensor with a resolution that is capable of imaging features marked on parts by the marker portion of the system 100. As further described herein, the system 100 may be configured to determine quality of the DPM symbol marked on a product. Alternatively, the system 100 may operate in conjunction with an external computing system, such as shown in FIG. 4.

In an embodiment, the system 100 may include a laser marker 104 (FIG. 1B) configured to mark a DPM symbol (e.g., machine-readable indicia, such as linear barcodes or 2-dimensional codes, logos, and/or text) onto a surface of a part 102. After marking the part 102 with a DPM symbol, the system 100 may read the DPM symbol on the part 102 and compute grades for metrics of a grade profile, as further described herein. In an embodiment, in response to the reader by the system 100 reading the DPM symbol, a visual indicator may be illuminated onto the part to indicate to an operator that the reading passed (e.g., green light) or failed (e.g., red light). Other indicators, including an audible indicator, may additionally be provided on the system 100. By applying an illumination signal onto the part 102, the operator may be able to work without having to take his or her eyes off of the part 102. The use of a green light in particular enables an operator to see the visual signal when wearing safety protective goggles or through safety inspection window. It should be understood that a fully automated production line in which a system that marks and reads DPM symbols is used may also illuminate a part with an illumination signal onto a part for visual inspection purposes.

With regard to FIG. 1B, the system 100 includes the laser marker 104 and one or more cameras 106a and 106b (collectively 106) offset from the laser marker 104 to detect distance of a part from the laser marker 104, and to receive offset information from a marking area on the part 102. The cameras 106 may also be used to inspect the DPM marking during and/or after the part 102 is marked. The cameras 106 may provide for 2D and/or 3D inspection.

With regard to FIG. 1C, a handheld or fixed reader 108 may be used for layout selection and data feeding. The laser marker 104 of the system 100 may receive information directly from the reader 108 via a wire or wirelessly, and select a layout (e.g., layout of a DPM symbol based on a type of part surface area, etc.) and/or feed variable data (e.g., lot number, part type, etc.). The reader 108 may perform a visual inspection of the part 102, read a barcode attached to or otherwise associated with the part 102, or of a DPM symbol already marked on the part 102 or a sub-component of the part 102 to provide the layout and/or variable data to the laser marker 104. The reader 108 may also be configured to perform shape, sized, texture, character (e.g., OCR), or other visual inspection and/or recognition. The visual inspection may generally be used for performing quality validation. The quality validation may be any level of validation, such as edge sharpness, depth measurements, and so forth.

Quality validation may be made in a number of ways and at a number of levels of quality. For example, a high-quality inspection may be made by the reader 108 to perform DPM symbol reading inspection, a quality grading of DPM symbols may be based on the grading of several individual metrics measured by optical inspection, as shown in TABLE I below.

TABLE I

DPM Symbol Measurement Metrics

Decode
Cell Contrast
Cell Modulation
Unused Error Correction
Print Growth
Axial Non-Uniformity
Grid Non-Uniformity
Fixed Pattern Damage
Minimum Reflectance Each metric may be assigned a grade from the set {A, B, C, D, F}. It should be understood that alternative sets of grades, such as numerical grades, may be utilized. Any set of grades that are consistent with industry standards may be utilized. In an embodiment, the individual metrics and acceptable grades set or assigned thereto may be used to accept or reject parts during production inspection. In one embodiment, the individual metrics grades or values may also be set to ignore those metric(s) to avoid rejecting parts based on an individual metric that is immaterial to a part on which a DPM symbol is marked.

Although the principles described herein provide for determining grades for individual metrics and using those grades in determining whether a DPM symbol passes or fails, the principles may additionally be configured to determine an overall grade by selecting a minimum grade from amongst all of the metrics that have been identified as being available for use in performing grading and exclude metric (s) that are identified as not being used for performing grading (e.g., "Not Controlled"). The overall grade of the metrics identified as being available for use in performing grading may thereafter be used for accepting or discarding a part marked with a DPM symbol. Additional details of establishing and verifying individual metrics may be found in co-pending U.S. Patent Application 62/611,497 filed on Dec. 28, 2017, the contents of which are hereby incorporated by reference in their entirety.

TABLE II provides an illustrative grade profile that may be used for measuring a DPM symbol marked on a part. The grades for each of the metrics may be used to compare against measured metrics in reading and the DPM symbols marked on parts. Additionally and/or alternatively, an overall grade of the metrics may be used.

TABLE II

| Grade Profile | |
|---|---|
| Metric | Grade Profile |
| CC | B |
| CM | A |
| UEC | A |

TABLE II-continued

Grade Profile

| Metric | Grade Profile |
|---|---|
| ANU | C |
| GNU | B |
| FPD | B |
| MR | Not Controlled |

Figure 2B:
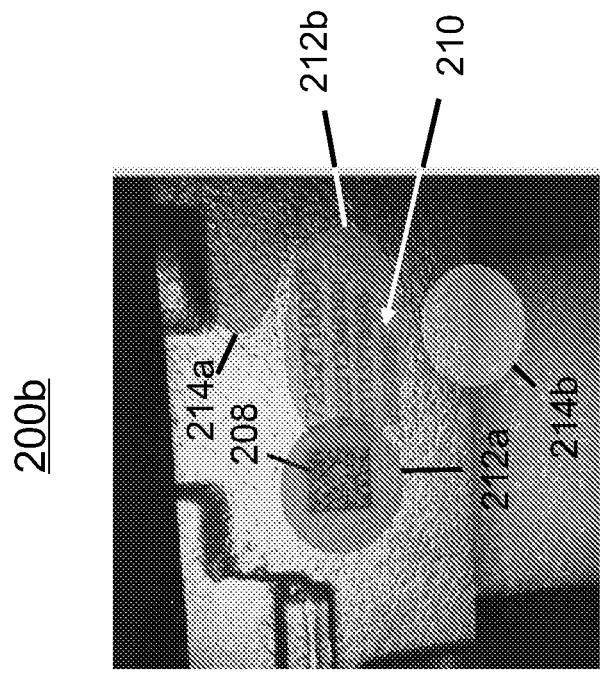
FIGS. 2A and 2B are illustrations of an illustrative part having DPM features imprinted thereon along with illumination spots to provide an indication.
Figure 2A:
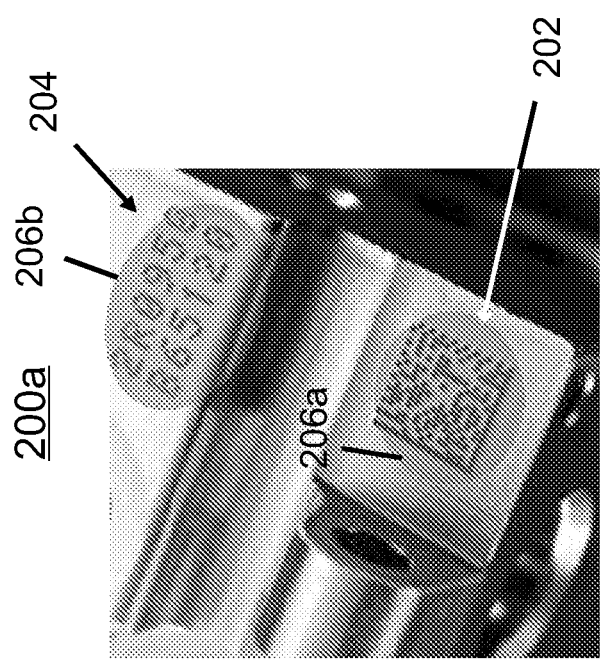

With regard to FIG. 2A, an illustration of an illustrative part 200a having a DPM symbol 202 imprinted thereon is shown. In this case, it can be seen that the part 200a and DPM symbol 202 are well lit to minimize reading errors. The DPM symbol 202 is a 2D QR code, as understood in the art, that is laser marked into the part 200. Also marked into the part 200a is another DPM feature, specifically text 204. As with the DPM symbol 202, the text 204 may be inspected with a visual inspection system.

The visual inspection systems may be configured to visually inspect DPM features and/or other surface features of the part 200a. An illumination sub-system may be configured to illuminate the part or portions thereof with one or more visual indicators (i.e., one or more visual illumination signals (e.g., light spots)). The visual illumination signals may be illuminated onto one or more of the DPM features after inspection to indicate that the DPM feature was successfully inspected and passed, failed, or an uncertainty exists. As shown, visual illumination signals 206a and 206b (collectively 206) are positioned on respective DPM symbol 202 and text 204 to indicate to an operator the marking and reading were successful. Visual illumination signals may also indicate a function of the DPM marker having no errors, laser operating properly, data properly processed, etc.

With regard to FIG. 2B, an illustration of an illustrative part 200b including a DPM symbol 208 marked thereon is shown. In this case, the image of the part 200b is captured in a manufacturing facility in which the lighting is not as good as FIG. 2A, and the image of the DPM symbol 208 on the part 200b is degraded. As a result of the image being degraded, visual metrics often have reduced metric grades as compared to grades of the individual metrics when the DPM symbol 208 is measured in a controlled environment due to lighting and environmental impacts during imaging of the DPM symbol 208 on the part 200b. As further described herein, an overall grade of the DPM symbol is set to the lowest of the individual metrics. Text 210 may also be marked onto the part.

As shown, multiple visual indicators 212a and 212b are illuminated onto the DPM symbol 208 and text 210 in response to determining quality, correctness, position, status of DPM marker throughout the marking process, and so forth. Color of the respective visual indicators 212a and 212b may be based on the various factors (e.g., red if a bad marking occurred, green if a good marking occurred, yellow if undetermined or further inspection is needed, orange if warming up, blue if the system is activated). In an embodiment, if multiple laser systems are operating, then a visual indicator may be used to notify an operator which one or more are currently operating. Such an indication may include an alphanumeric character, such as A, B, and/or C, to show which of three laser systems are operating, for example. The laser systems may each be in communication with a communications network or field bus, as further described herein.

Figure 3:
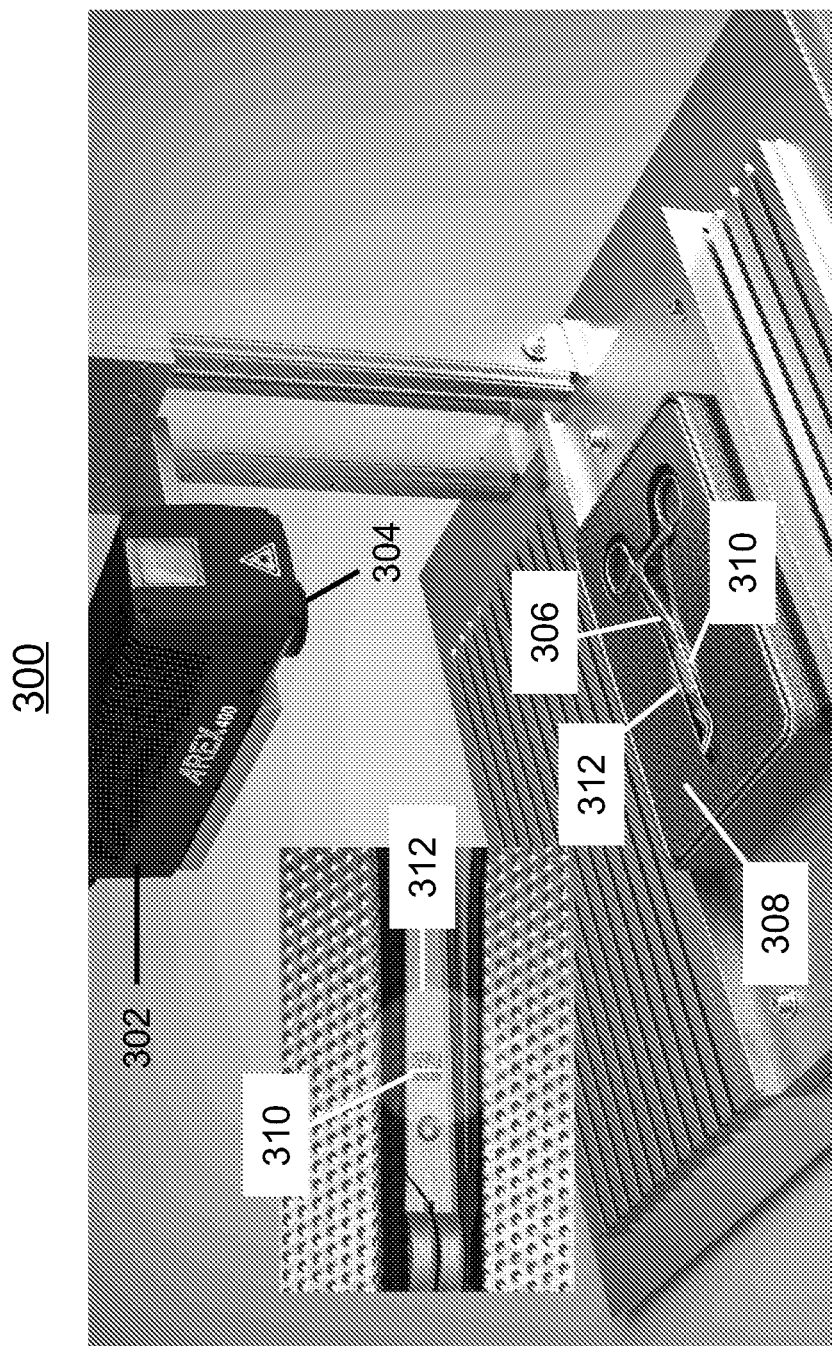
FIG. 3 is an illustration of an illustrative part including a DPM marking machine that marks parts with a DPM symbols or otherwise.

With regard to FIG. 3, an illustration of an illustrative DPM system 302 for marking parts is shown. The system 302 may include a window 304 through which a laser beam is output for marking (e.g., engraving) a part 306. In this case, the part is a surgical instrument. The part 306 as shown to be positioned and reside within a surface 308 of packaging. A DPM symbol 310 is shown to be edged into a portion of the part 306. In response to the DPM symbol 310 being correctly marked on the part 306 and optionally other factors being determined, a visual illumination signal or visual indicator 312 may be illuminated onto the DPM symbol 310 or on the part 306 close to the DPM symbol 310 to provide an operator with an indication as to whether the system 302 operated properly. As previously described, while the system 302 is in different states or stages of operation, the system 302 may be configured to illuminate visual illumination signals onto the part 306 to provide an indication to an operator of being in the different states or transitioning between the different states. For example, during a warmup period, a first visual indicator may be output, when in a "system activated" mode and/or "ready to mark" mode, a second visual indicator may be output when the system is marking, a third visual indicator may be output after completion of the marking, a fourth visual indicator may be output if the marking is determined to be correct amongst other factors, and/or after inspection, a fifth visual indicator may be output. In being activated, if one or more laser systems are online (i.e., connected to a network or bus and in communication with a computing system) and available to be used for marking the same or different types of parts in parallel with one another, then a visual indication may be output by each of the respective laser systems to indicate to an operator that the laser system is activated. During setup or a configuration phase, a visual indication of which laser system(s) are active and in communication with a computing system and management software may be produced to notify an operator. The different visual indicators may be sized, shaped, colored, or otherwise different to enable the operator to distinguish the different states or stages of the system 302 during the DPM marking and optional inspection process, as further described herein.

Figure 3B:
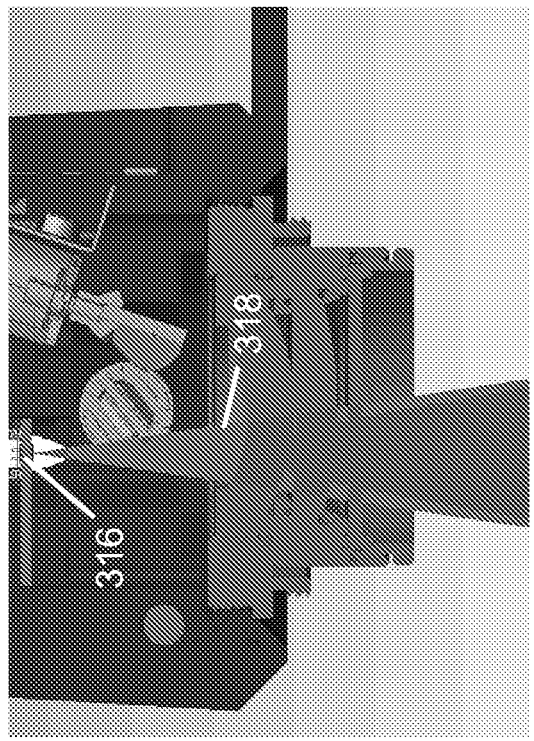
FIGS. 3A and 3B are illustrations of a laser marking head of a laser marker.
Figure 3A:
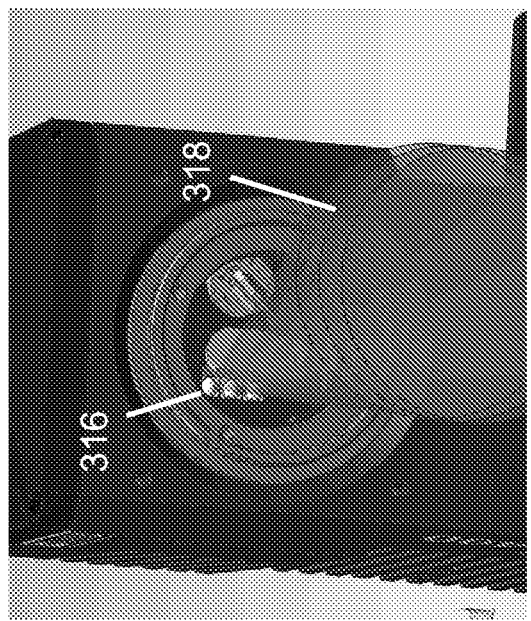

With regard to FIGS. 3A and 3B, illustrations of a laser marker head 314 of a laser marker may have a galvanometric scanning system that may be moved in a position that does not obstruct a light path from an illumination unit including an LED or laser 316 (e.g., green or other color) to a lens and the work piece or part. The illumination unit may be part of or separate from the laser marker head 314 and be configured with one or more illumination device (e.g., LED 316). The configuration permits a compact marker head and makes possible to use the same lens for the laser marking and a visual illumination signal 318 to produce a spot or other illumination signal on a part or work surface.

With regard to FIG. 4, an illustration of an illustrative embodiment 400 in which a computing system 402 that may be used during an inspection process of DPM markings is shown. The computing system 402 may receive image data 404 of the DPM feature(s) (e.g., DPM symbol(s)) on parts captured by one or more DPM mark and read system(s) 406a-406n (individually or collectively 406) in an uncontrolled environment (e.g., production equipment not in a controlled environment, such as a clean laboratory). The computing system 402 may process the image data 404 via a communications network or field bus 405, as understood in the art, for use in performing inspections (i) of the DPM symbol(s), and (ii) the parts on which the DPM symbol(s) are marked, in accordance with the principals described herein. Each of the systems 406 may have different network addresses so that communications with the computing system 402 with each of the systems 406 are independent from one another. The system 402 may be configured to illuminate visual indicator(s) during different state(s) or transitions between the states, as described herein. The computing system 402 may include a processing unit 408 that executes software 410 for performing functionality, as further described herein. The processing unit 408 may include one or more processors, including general, image, signal, or other processing devices.

The processing unit 408 may be in communication with a memory unit 412 that is configured to store data, such as processed image data in determining (i) grades for each metric of a profile for a DPM symbol and (ii) grades for metrics when inspecting the DPM symbol in an uncontrolled environment. Data to be used for verifying other DPM features may also be stored. The processing unit 408 may further be in communication with an input/output (I/O) unit 414 that is configured to communicate data via a communications network, such as a local or wide area wired or wireless communications network. A storage unit 416 in communication with the processing unit 408 may be configured to store (i) a grades profile for a DPM symbol, (ii) image data captured during inspection of DPM symbols imprinted on parts during production inspection, or (iii) otherwise. The storage unit 416 may be configured to store data repositories 418a-418n (collectively 418) for storing data associated with one or more DPM symbols, any data derived therefrom during optical inspection of DPM symbols on parts during inspection, or otherwise.

In an alternative embodiment, which may be a primary embodiment, rather than communicating the image data 404 from the DPM mark and read system 406 to the computing system 402, the system 406 may be configured to process images, compute metric grades and/or perform other analyses. The metric grades computed by the system 406 may be communicated to the computing system 402 to compare with the profile of acceptable grades for the metrics to determine whether the DPM symbol passes or fails inspection. Depending on a configuration of the DPM mark and read system 406, the computing system 402 or the DPM mark and read system 406 may be configured to control production equipment used to control marking (e.g., laser engraving or etching) in response to determining that a grade of one or more metrics of a barcode or other DPM symbol that is read by the system 406 pass(es) or fail(s). As an example, in response to determining that a grade of a metric passes or fails or an overall grade of the entirety of the metrics being analyzed passes or fails, as further described herein, the computing system 402 or system 406 may instruct production equipment (not shown) to move or convey the part associated with the barcode to a "pass" location (e.g., onto a first conveyer) or a "fail" location (e.g., onto a second conveyer).

As previously described, the system 406 may be configured to perform a variety of events and combination of events. The events are used to control various devices or sub-systems (e.g., DPM marking unit, reading unit) of the system 406 and functions performed by those sub-systems. Illustrative events may include alone or in combination, but are not limited to, the following:

(1) System ready to mark—the system may be warmed up and prepared to perform DPM marking of DPM features (e.g., DPM features), as previously described.

(2) System secure (laser disabled)—the system may be powered up, but the laser may be disabled, thereby preventing injury to operators and avoiding inadvertent marking (3) Marking process completed—after completing a DPM marking of a DPM feature, the system 406 may generate a marking process complete indication.

(4) Marking process completed correctly—in addition to the system 406 indicating that the marking process was completed, the system 406 may indicate that the marking process completed correctly in that no errors occurred during the marking process and all anticipated marking functions were successfully completed.

(5) Marking process completed and DPM feature validated—in addition to the marking being completed, a reading system may be configured to image or scanned to read and validate that the marked DPM feature was properly written. For example, a code matching, code grading, or other verification of a DPM feature may be performed.

(6) Marking process completed and text validated (OCV)—in addition to the marking being completed, a reading system may be configured to image and validate text (DPM feature) using optical character verification process.

(7) Marking process completed and logo validated—in addition to the marking being completed, a reading system may be configured to image and validate graphics (DPM feature) using contrast analysis, pattern matching, and/or any other vision inspection process.

(8) Focal distance corrected—a distance measuring system may be configured to measure distance of a part from a DPM marker. Once determined, a focal distance of the DPM marker may be adjusted so that a laser is focused on a surface of the part.

(9) Axis movement ended—in an embodiment, if the system 406 is configured to move a part to enable the DPM marker to mark onto the part, but an axis on which the part is moved ends, the system 406 may generate an "axis movement ended" notification.

(10) auto-positioning correct (with vision camera upstream of the DPM marker; a camera or image sensor may be configured to detect a part position and generate such data to the DPM marker or controller therefor, such that the laser marker sets parameters accordingly to properly mark the part.

(11) marking error or system failure—if any errors or system failures occur, a message indicative of the system 406 having a marking error or system failure may be generated.

Visual indicators projected on marking area (with a light beam of one or more colors) may include the following separate, combinations, and/or sequence of indicators:

(1) GRAPHICAL "LEFT"/"RIGHT"/"UP"/"DOWN" ARROW: assisted positioning—visual indication of correct positioning (2) GRAPHICAL SYMBOL "OK" "DONE" "END"—the system 406 may generated and display a graphical system to indicate to the operator a stage of a DPM marker.

(3) any other GRAPHICAL SYMBOL (e.g., hour glass) may indicate a process running (Axis movement, marking in action, acquisition running, etc.).

(4) GRAPHICAL ANIMATION (creation of simple animations)—a scan system may be combined with a light source to project a moving beam, and may be used to create simple animations instead of fixed graphics. The scan system may be one embodiment of how the above-described indications that may be realized beyond a mere "spot" or simple pattern created by a laser source and associated optics.

As previously described, the events may form a sequence of events that define one or more functions. For instance, the DPM laser marking system may indicate on a work piece (e.g., part) or on a supporting plane or conveyor the following temporal sequence:

Step A: Auto-positioning correct;
System B: System activated;
Step C: System ready to mark;
Step D: Marking process completed;
Step E: Marking process completed correctly; and/or
Step F: Marking process completed and DPM symbol validated (include, code matching, code grading, etc.),
Step G: Marking process completed and text validated (OCV); and/or
Step H: Marking process completed and logo validated (include suitable contrast analysis, pattern match, other vision inspections). This step may include a confirmation that a part offset was successfully corrected, which is a feature connected to the use of the vision system to detect and correct part positioning errors or offsets.

Figure 5:
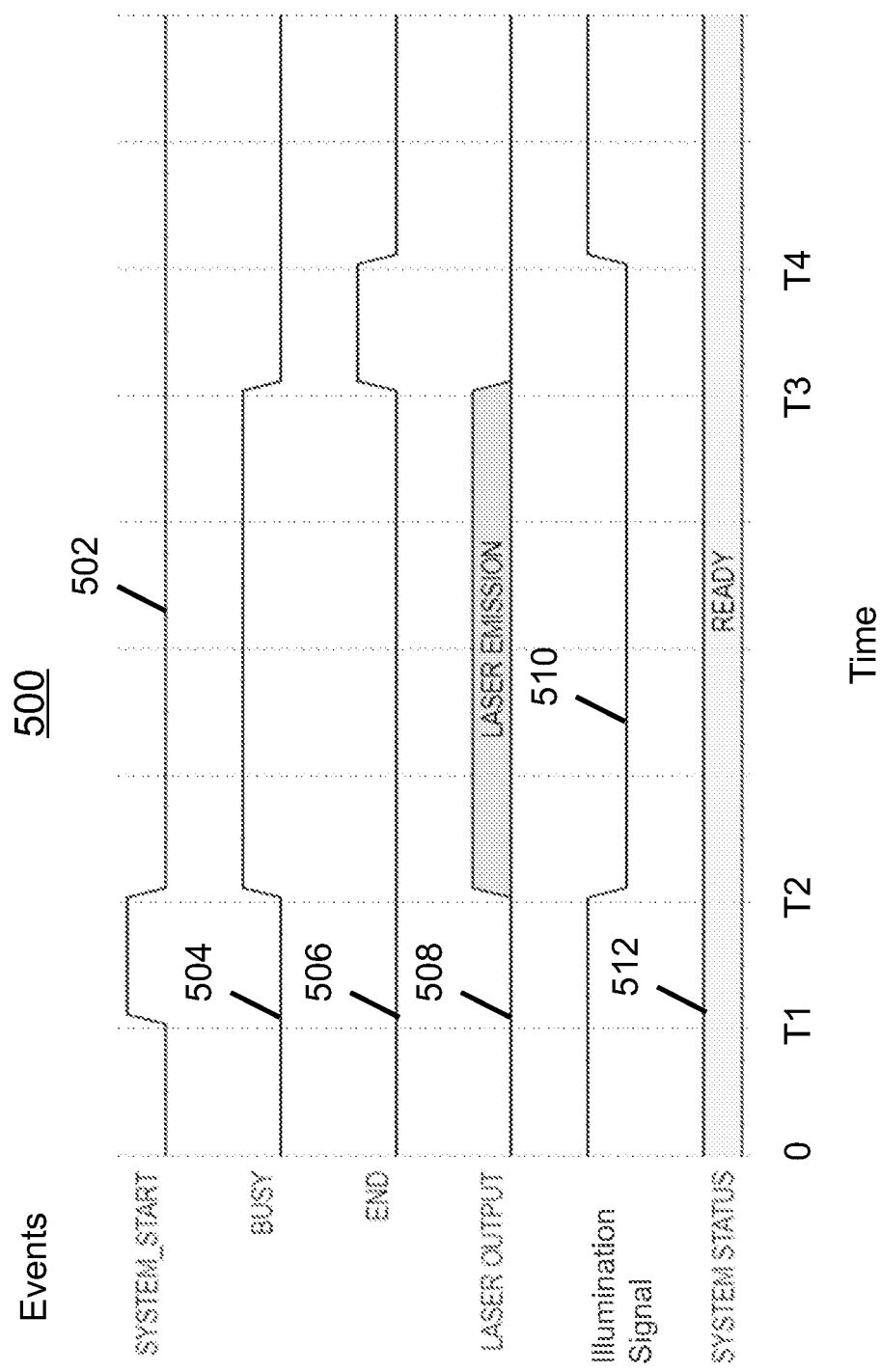
FIG. 5 is a timing diagram of an illustrative DPM marking and operator notification process that may be configured to notify an operator of various stages of readiness, and/or marking by a DPM machine.

With regard to FIG. 5, a timing diagram of an illustrative DPM and operator notification process 500 is shown. The process 500 may include a number of events that occur over time. A resulting physical output of the events of the process 500 includes generating a visual indicator, such as a green visible illumination signal, to be illuminated onto a center of a DPM marking field on a surface of a part to be used as feedback to an operator. It should be understood that the visible indicator may be any other color, but that green is a color that is easily visible via common protective goggles or safety windows for infrared laser systems. The visible feedback indicator may be compatible with all F-Theta lenses used in a DPM marking system.

The process 500 may start at time T1, where a system start signal 502 transitions from low to high between times T1 and T2. The system start signal 502 indicates that the system is in a ready state. At time T2, a busy signal 504 may transition to be high to indicate to an external system that the DPM marking system is busy and marking a DPM feature on a part. The busy signal 504 may remain high between times T2 to T3. At the end of time T3, an end signal 506 may transition to be high between times T3 and T4 to indicate that the marking process is complete. A laser output signal 508 may be operated between times T2 and T3 during which a laser may be used to mark a part with a DPM feature (e.g., DPM symbol, logo, or text), as understood in the art. An illumination signal 510, in this embodiment, is shown to be OFF during times that the laser output signal is ON (i.e., between times T2 and T3) and extending through time T4 until the end signal 506 transitions from high to low. During times before time T2 and after T4, the illumination signal 510 may be ON to cause a visual indicators to be displayed on or near a part, therefore indicating respectively that the DPM system is ready to mark the part, and that the DPM system has completed the marking of the part. A system status signal 512 may be high during which the DPM marking system is active. According to an alternative embodiment, the illumination signal 510 may be ON only during times before time T2, indicating that the DPM system is ready to mark a part. According to another embodiment, the illumination signal 510 may be ON only during times after T4, indicating that the DPM system has completed the marking of the part. In an embodiment, a system activated signal (not shown) may include one or more events when one or more laser systems are turned ON and in communication with a computing system via a communications network or data bus.

Figure 6:
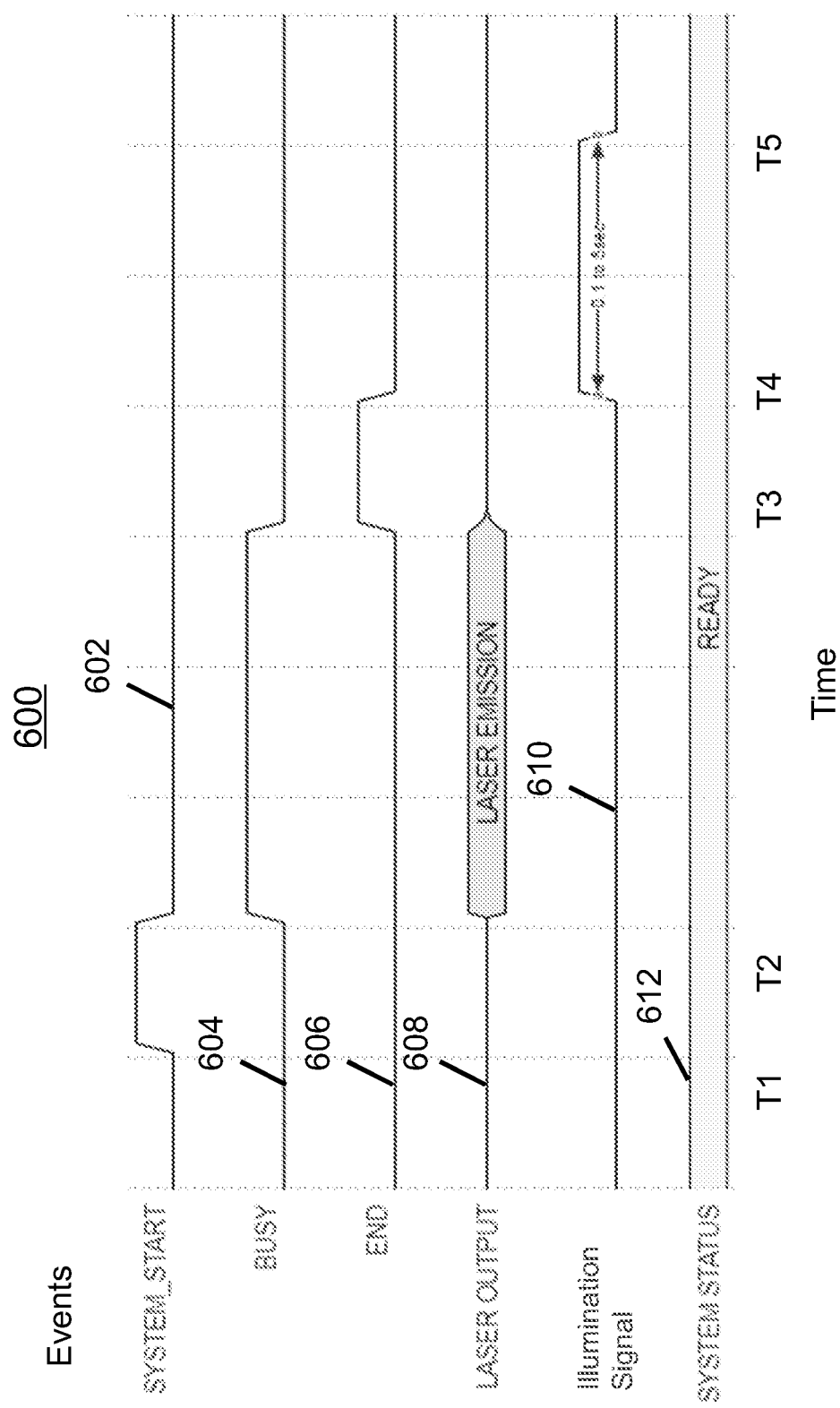
FIG. 6 is a timing diagram of an alternative illustrative DPM marking and operator notification process that may be configured to notify an operator of marking by a DPM machine.

With regard to FIG. 6, a timing diagram of an illustrative DPM marking and operator notification process 600 is shown. The process 600 may include a number of events that occur over time. The process 600 operates in the same or similar manner as the process 500 of FIG. 5. However, rather than the illumination signal being ON other than during the laser emission time between times T2 and T3, the illumination signal 610 may be ON between times T4 and T5 for a predetermined period of time. The predetermined period of time may range from about 0.1 seconds to about 5 seconds. Other time durations of time may be utilized, as well. The illumination signal 610, when ON, may cause a visible illumination signal to be generated. The illumination signal 610 may be generated in response to a determination that the DPM feature marking process was correctly executed (e.g., no errors, no stop marking, no status changing, proper laser power, etc.). The visible illumination signal produced while the illumination signal 610 is ON may be static or dynamic, as further described herein. In an embodiment, if a new marking process is started while the illumination signal 610 is ON, the illumination signal 610 may automatically be turned OFF, thereby causing illumination device(s) that is/are generating the visible illumination signal (e.g., green light) to be turned OFF.

Figure 7:
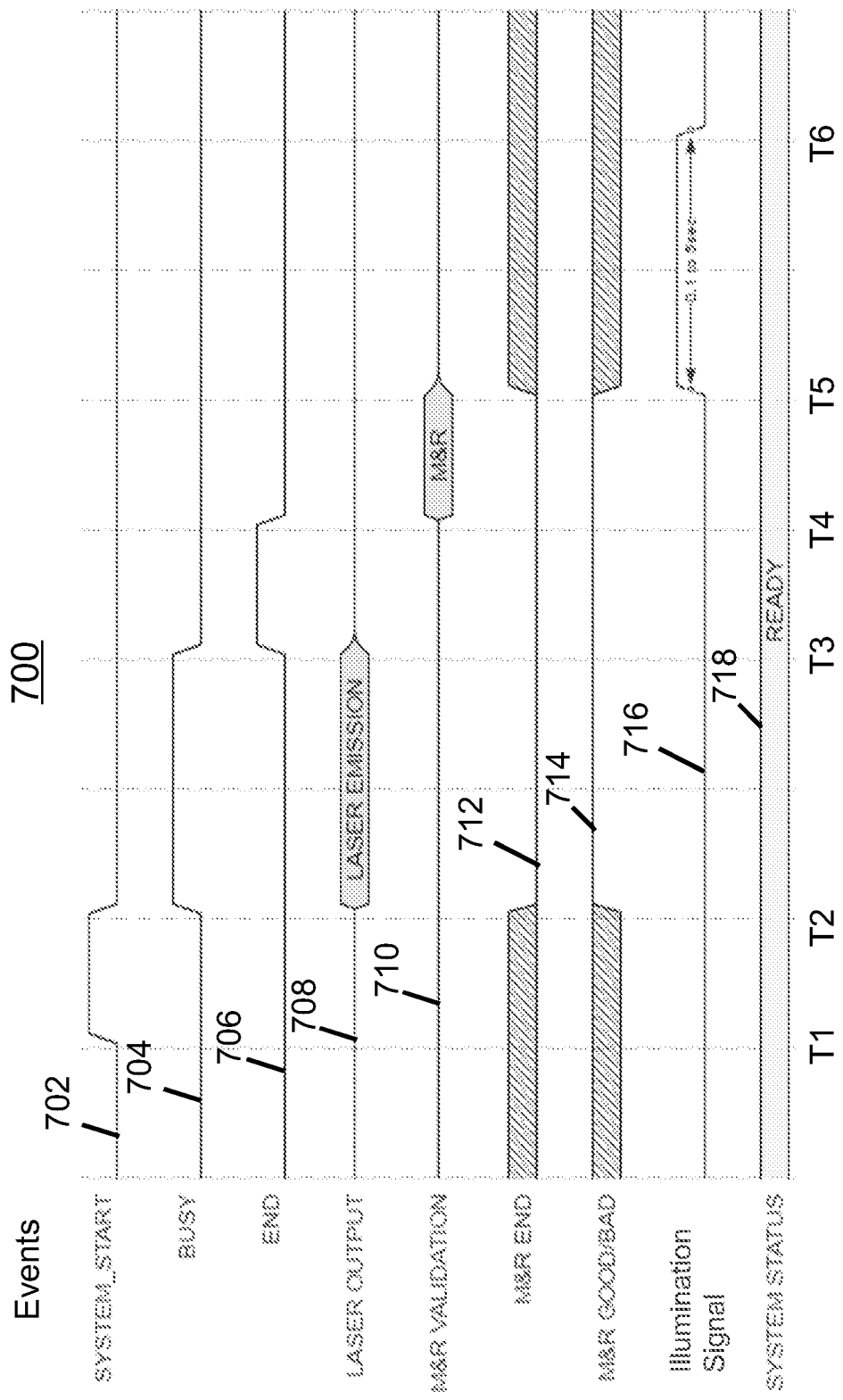
FIG. 7 is a timing diagram of an illustrative DPM inspection, verification, and operator notification process that may be configured to notify an operator of marking by a DPM machine.

With regard to FIG. 7, a timing diagram of an another illustrative DPM inspection, verification, and operator notification process 700 is shown. The process 700 may operate in the same or similar manner as the processes 500 and 600 of FIGS. 5 and 6. However, several additional control signals are added for managing the process 700. A system start signal 702, busy signal 704, end signal 706, and laser output signal may operate as previously described. As shown, a mark and read validation signal 710 may be used to image a DPM feature produced by the laser. The mark and read sub-process may occur between about time T4 and about time T5 to determine that DPM feature that was marked in a surface of a part was accurate based on grades other image recognition or measuring processes being performed, as previously described. A mark and read end signal 712 may be OFF from the start of the laser emission through the end of the mark and read sub-process at about time T5. A mark and read good/bad signal 714 may be at an ON level during the time period when the mark and read end signal 712 is OFF.

An illumination signal 716, when in an ON state, may cause a visible illumination signal to be generated as a visual indicator on the part. As with FIG. 6, the illumination signal 716 may be generated in response to a determination that the DPM mark and read process was correctly executed (e.g., no errors, no stop marking, no status changing, and the marked DPM feature was verified to be correctly marked by successfully reading the DPM feature). The signal 714 may be used to cause the illumination signal 716 to be a different color other than a color, such as green, that is indicative of the DPM mark and read process being successful. For example, if the reading process determines that one or more parameters of an inspection profile is below a certain grade, then the color or other feature of the illumination signal may be altered (e.g., yellow color, flashing ON and OFF, etc.). The visible illumination signal may be static or dynamic, as further described herein. In an embodiment, if a new marking process is started while the illumination signal 716 is ON, the illumination signal 716 may automatically be turned OFF, thereby causing illumination device(s) that is/are generating the visible illumination signal (e.g., green light) to be turned OFF.

Figure 8:
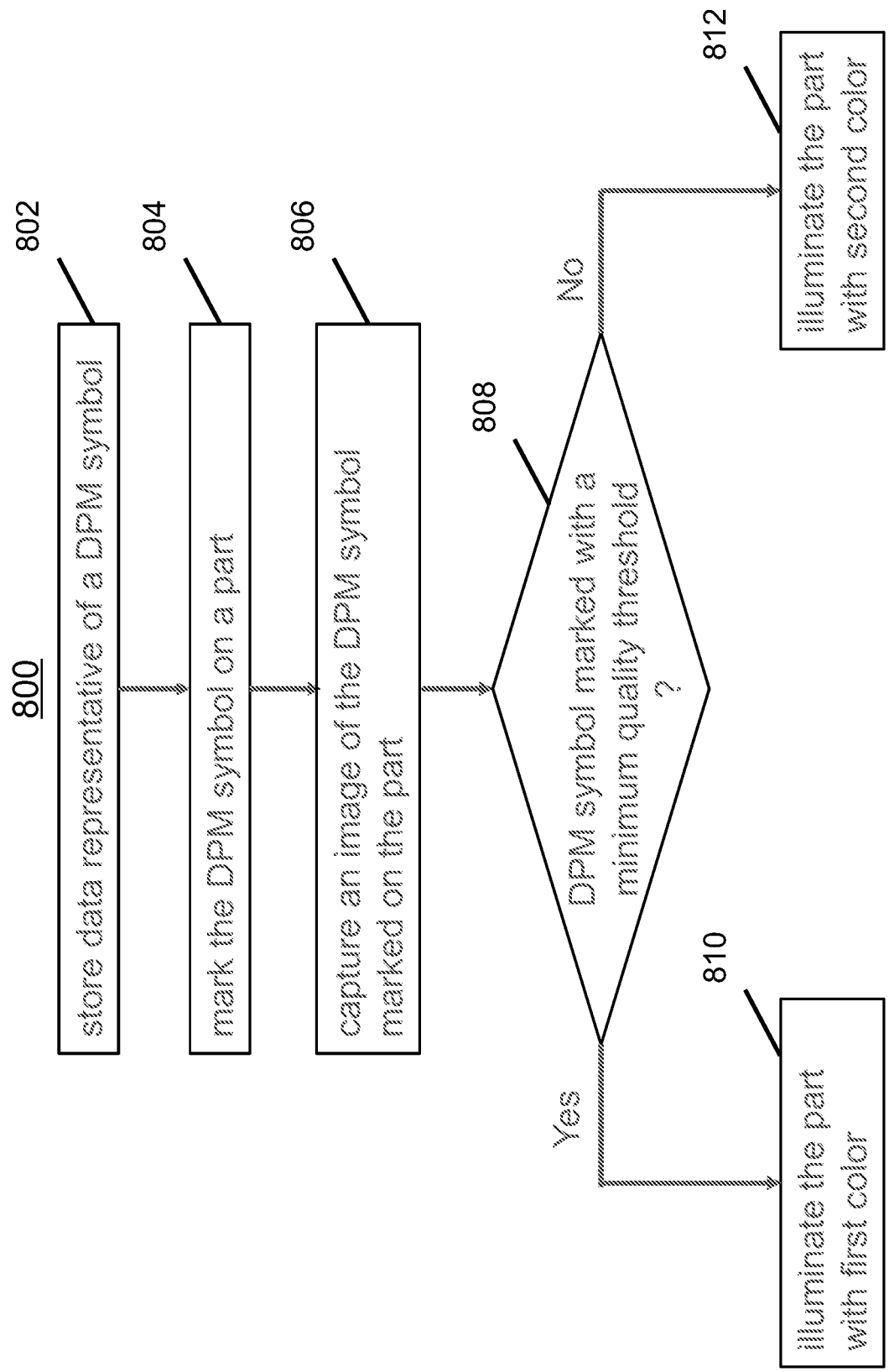
FIG. 8 is a flow diagram of an illustrative DPM inspection, verification, and operator notification process that may be configured to notify an operator of marking by a DPM machine.

With regard to FIG. 8, a flow diagram of an illustrative DPM inspection, verification, and operator notification process 800 is shown. The process 800 may start at step 802, where data representative of a DPM feature may be stored. The data may be digital data used to drive a DPM laser marker to mark the DPM feature into a surface of a part. At step 804, the DPM feature may be marked on a part. An image of the DPM feature marked on the part may be captured at step 806. At step 808, a determination from the captured image may be made as to whether the DPM feature marked on the part was marked with a minimum quality threshold. The minimum quality threshold may be made based on grading metrics measured in the captured image. If a determination is made at step 810 that the DPM feature marked on the part has a quality above the minimum quality threshold, the DPM mark and read system may illuminate the part with the visible illumination signal with a first wavelength. The first wavelength may be over a green spectrum color range as green is easily viewable via safety goggles used in production environments. Otherwise, at step 812, the part may be illuminated with a visible illumination signal with a second wavelength, such as wavelength over a red color spectrum.

Figure 9:
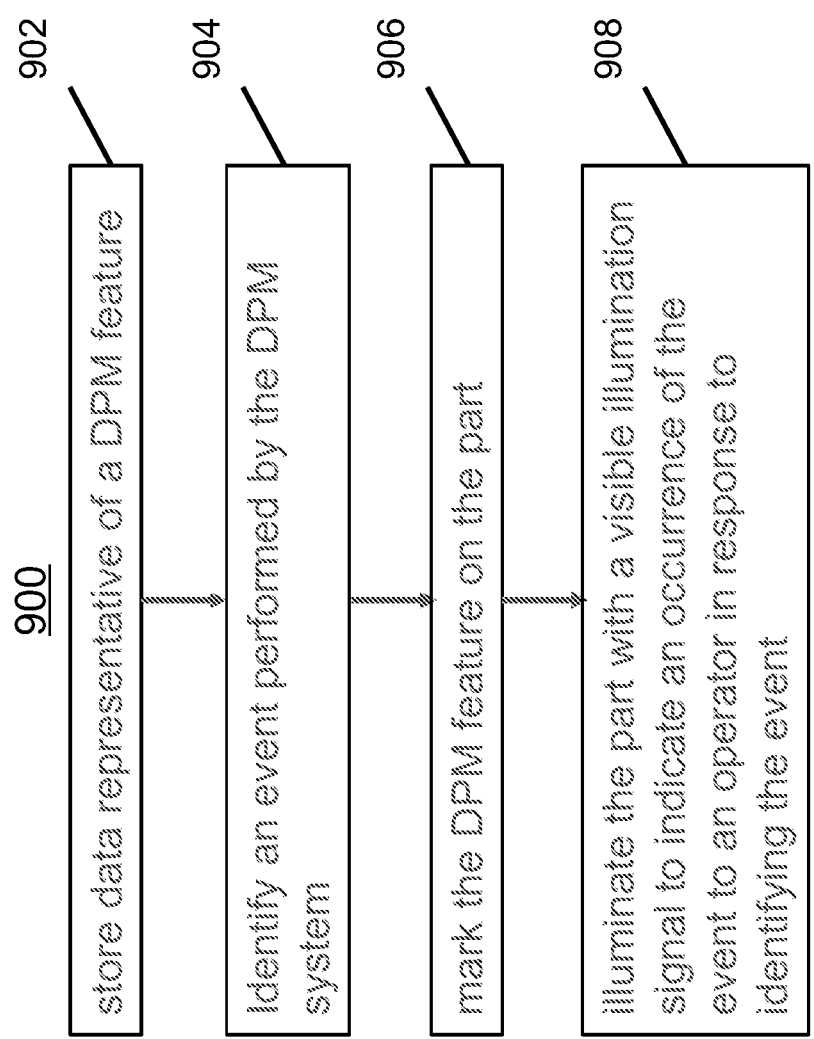
FIG. 9 is a flow diagram of an illustrative DPM marking and operator notification process based on an event performed by a laser marking system.

With regard to FIG. 9, a flow diagram of an illustrative DPM marking and operator notification process 900 based on an event performed by a system is shown. The process 900 may start at step 902, where data representative of a DPM feature may be stored. At step 904, an event performed by the DPM system may be identified. The DPM feature may be marked on the part. In an embodiment a laser marking unit may be driven to perform the marking. At step 906, the part may be illuminated with a visible illumination signal to indicate an occurrence of the event to an operator in response to identifying the event.

Figure 10:
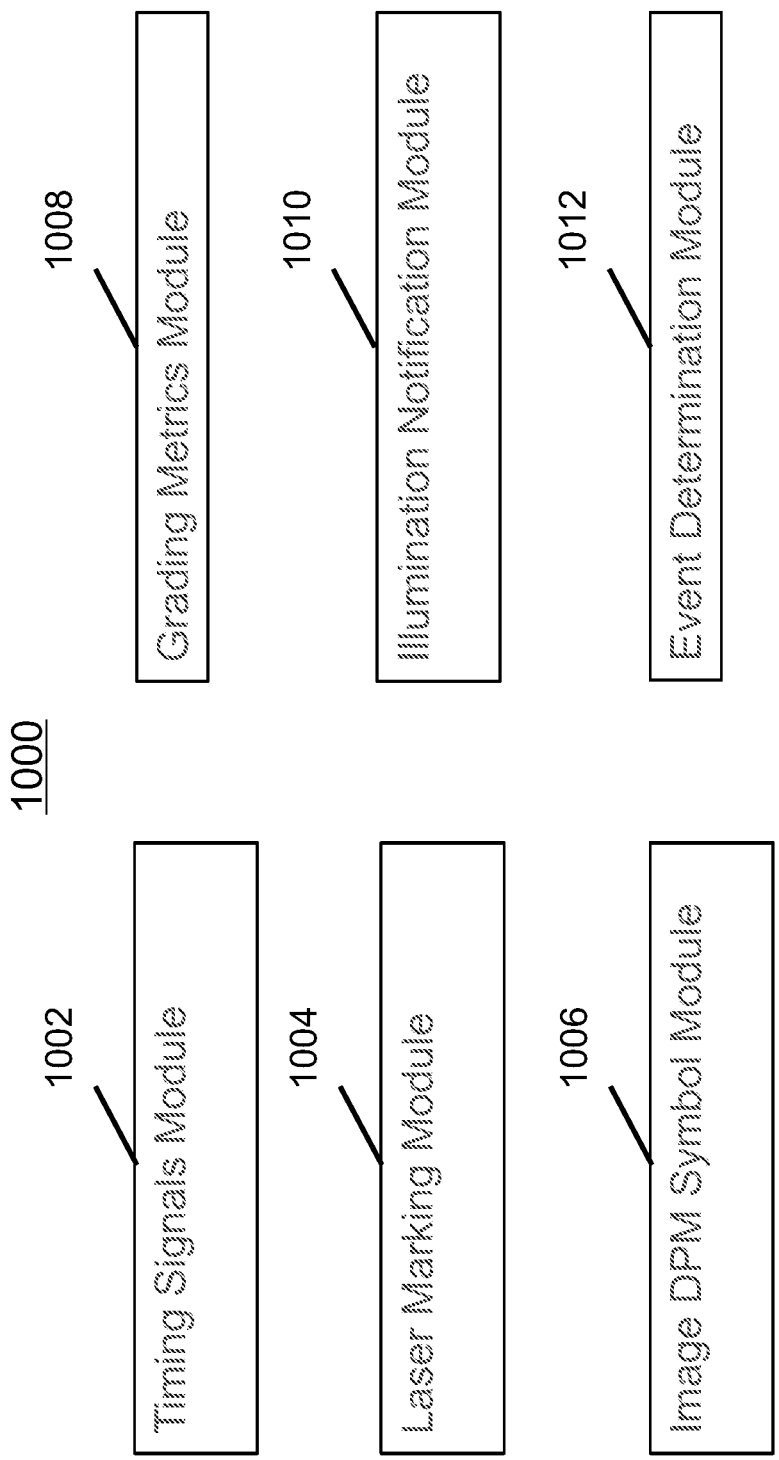
FIG. 10 is a block diagram of a set of modules that may be used to support operator notifications by illuminating parts.

With regard to FIG. 10, a block diagram of a set of modules 1000 that may be used to support creating and verifying DPM features is shown. The modules 1000 may include a timing signals module 1002 that may be configured to generate timing signals, such as those shown in FIGS. 5-7. The timing signals may be used to drive electrical components of a DPM marking system. Such electrical components may include drive circuits to drive illumination devices, laser marking components, image sensor, and so on.

A laser marking module 1004 may be configured to drive a laser marking unit to generate a laser beam to mark (e.g., engrave or laser etch) a surface of a part. The module 1004 may drive the laser along with actuator elements (e.g., beam steering elements, tip-tilt mirror, galvanometric scanning system, etc.) that aim the laser beam to form a DPM feature (e.g., DPM symbol, graphic, pattern, etc.) in the surface of the part. Data may be communicated to the module 1004 to drive the actuator elements.

An image DPM symbol module 1006 may be configured to capture an image of the DPM feature, such as a DPM symbol written by the DPM marker. The module may produce image data that may be used to determine quality of metrics of the DPM feature on the part.

A grading metrics module 1008 may be configured to determine grades of individual metrics of a DPM feature captured by the module 1006. The module 1008 may also be configured to determine an overall metric based on a lowest metric of the individual metrics. The grades of the metrics may be determined in accordance with industry standards, as understood in the art. Other measurement or image recognition may be performed.

An illumination notification module 1010 may be configured to generate a visual indicator, such as an illumination signal, that is illuminated on the part. The visual illumination signal may be over a wavelength, such as a green wavelength. The visual illumination signal may be generated by an LED or other illumination source, such as a laser source, and the visual illumination signal may be projected along at least a portion of an optical or light path that a DPM symbol laser marker uses. Alternatively, the visual illumination signal may be projected over a different path, such as via a different window than a laser marking window.

An event determination module 1012 may be configured to determine an event that occurs. The event may be an one, combination, and/or series of events of which the machine reader may perform, as previously described. In response to identifying an event, a number of illuminations may be performed to illuminate a part or surface at or near a part in a manner that an operator may easily view to determine a state in which the DPM mark and read system is in or is transitioning from a first state to a second state.

One embodiment of a method for performing direct part marking (DPM) may include identifying an event performed by a DPM system. A laser marking unit may be driven to mark the DPM feature on the part. The part may be illuminated with a visible illumination signal to indicate an occurrence of the event to an operator in response to identifying the event.

In an embodiment, identifying an event may further include identifying any of a "warming-up" event, "system activated" event, "ready-to-work" event, "marking" event, "proper position" event, or "marking complete" status. Other events may additionally and/or alternatively be identified. Identifying may include a processor executing instructions to cause a DPM mark and read system to perform the events, and those events may be identified and output for use in producing a visible indicator or visible illumination signal. An image of the DPM feature marked on the part may be captured, and a determination from the captured image may be made as to whether the DPM symbol marked on the part was marked with a minimum quality threshold. If a determination is made that the DPM symbol marked on the part has a quality above the minimum quality threshold, the part may be illuminated with the visible illumination signal with a first wavelength. Otherwise, the part may be illuminated with the visible illumination signal with a second wavelength.

Illumining the part with the visible illumination signal with a first wavelength may include illuminating the part with the visible illumination signal that defines a green light. In an embodiment, a determination as to whether the part is in position to be marked may be performed, and a visible illumination signal may be generated to illuminate the part, where the visible illumination signal may be a third wavelength. A determination as to whether marking of the part is completed, and a second visible illumination signal may be generated in response to determining that the marking of the part is complete, where the second visible illumination signal may have a fourth wavelength. Otherwise, a third visible illumination signal having a different wavelength than the second visible illumination signal may be generated or a third visible indication signal may not be generated at all.

The visible illumination signal may be output along at least a portion of a light path of a laser marking unit. In an embodiment, a human-readable symbol can be produced and illuminated on the part. An image of the DPM feature may be captured. A determination that the image of the DPM feature was correctly marked and read may be made. The part may be illuminated with an illumination signal that is indicative of the DPM feature having been correctly marked and read. Illuminating the part with the visible illumination signal may include illuminating the part with the visible illumination signal for a predetermined amount of time (e.g., between approximately 0.1 and approximately 5 seconds).

The foregoing method descriptions and the process flow diagrams are provided merely as illustrative examples and are not intended to require or imply that the steps of the various embodiments must be performed in the order presented. As will be appreciated by one of skill in the art, the steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations may be performed in parallel or concurrently. In addition, the order of the operations may be re-arranged. A process may correspond to a method, a function, a procedure, a subroutine, a subprogram, etc. When a process corresponds to a function, its termination may correspond to a return of the function to the calling function or the main function.

The various illustrative logical blocks, modules, circuits, and algorithm steps described in connection with the embodiments disclosed here may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to and/or in communication with another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the invention. Thus, the operation and behavior of the systems and methods were described without reference to the specific software code being understood that software and control hardware can be designed to implement the systems and methods based on the description here.

When implemented in software, the functions may be stored as one or more instructions or code on a non-transitory computer-readable or processor-readable storage medium. The steps of a method or algorithm disclosed here may be embodied in a processor-executable software module which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used here, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The previous description is of a preferred embodiment for implementing the invention, and the scope of the invention should not necessarily be limited by this description. The scope of the present invention is instead defined by the following claims.

The invention claimed is:

1. A direct part marking (DPM) system, comprising:
a laser marking unit configured to mark DPM features on parts;
an illumination unit configured to produce a visible illumination signal to be illuminated onto a part being marked with a DPM feature;
a processing unit in communication with the laser marking unit and illumination unit, the processing unit configured to:
control the laser marking unit to mark the part with the DPM feature;
identify a plurality of events performed by the DPM system; and
cause the illumination unit to illuminate the part with the visible illumination signal to indicate an occurrence of at least two of the events in response to identifying the at least two of the events; and
an imaging device configured to capture images of the DPM features marked on the parts, and wherein the processing unit is further configured to:
cause the imaging device to capture an image of the DPM feature;
determine that the image of the DPM feature was correctly marked and read; and
cause the illumination unit to illuminate the part with the illumination signal that is indicative of the DPM feature having been correctly marked and read.

2. The system according to claim 1, wherein the processing unit, in identifying the plurality of events, is further configured to identify at least two of a "warming-up" event, "system activated" event, "ready-to-work" event, "proper position" event, "marking" event, or "marking complete" status.

3. The system according to claim 1, further comprising:
at least one second laser marking unit configured to mark the DPM features on parts in communication with the processing unit; and
a second illumination unit associated with the at least one second laser marking unit, and configured to produce the visible illumination signal to be illuminated onto the part being marked with the DPM feature.

4. The system according to claim 1, wherein the illumination unit is configured to output the visible illumination signal along at least a portion of a light path of the laser marking unit.

5. The system according to claim 1, wherein the processing unit is configured to cause the visible illumination signal to produce a human-readable symbol on the part.

6. A direct part marking (DPM) system, comprising:
a laser marking unit configured to mark DPM features on parts;
an illumination unit configured to produce a visible illumination signal to be illuminated onto a part being marked with a DPM feature;
a processing unit in communication with the laser marking unit and illumination unit, the processing unit configured to:
control the laser marking unit to mark the part with the DPM feature;
identify an event performed by the DPM system;
cause the illumination unit to illuminate the part with the visible illumination signal to indicate an occurrence of the event in response to identifying the event;
an imaging device configured to capture images of the DPM features marked on the parts, and wherein the processing unit is further configured to:
cause the imaging device to capture an image of the DPM feature marked on the part;
determine from the captured image whether the DPM feature marked on the part was marked with a minimum quality threshold; and
if a determination is made that the DPM feature marked on the part has a quality above the minimum quality threshold, cause the illumination unit to illuminate the part with the visible illumination signal with a first wavelength.

7. The system according to claim 6, wherein the processing unit is further configured to cause the illumination unit to illuminate the part with the visible illumination signal with a second wavelength if a determination is made that the DPM feature marked on the part has a quality below the minimum quality threshold.

8. The system according to claim 6, wherein the processing unit is further configured to:
determine whether the part is in a position to be marked; and
cause the illumination unit to generate the visible illumination signal to illuminate the part in response to determining that the part is in position to be marked.

9. The system according to claim 8, wherein the processing unit, in causing the illumination unit to generate the visible illumination signal, is further configured to cause the illumination unit to generate a third wavelength to illuminate the part.

10. The system according to claim 6, wherein the processing unit is further configured to:
determine whether the laser marking unit completed marking the part; and
cause the illumination unit to generate a second visible illumination signal to illuminate the part in response to determining that the marking of the part is complete, otherwise, generate a third visible illumination signal having a different wavelength than the second visible illumination signal or generating no second or third visible illumination signal.

11. The system according to claim 10, wherein the processing unit is further configured to cause the illumination unit to generate the second visible illumination signal with a fourth wavelength to illuminate the part in response to determining that the marking of the part is complete.

12. A method for performing direct part marking (DPM), comprising:
identifying a plurality of events performed by a DPM system;
marking a DPM feature on a part;
illuminating the part with a visible illumination signal to indicate an occurrence of at least two of the events in response to identifying the at least two of the events;
capturing an image of the DPM feature marked on the part;
determining from the captured image whether the DPM feature marked on the part was marked with a minimum quality threshold; and
if a determination is made that the DPM feature marked on the part has a quality above the minimum quality threshold, illuminating the part with the visible illumination signal with a first wavelength.

13. The method according to claim 12, wherein identifying the plurality of the events further includes identifying at least two of a "warming-up" event, "system activated" event, "ready-to-work" event, "proper position" event, "marking" event, or "marking complete" status.

14. The method according to claim 12, further comprising:
identifying a second plurality of events performed by a second DPM system operating in parallel with the DPM system by a processing unit in communication with both the DPM system and the second DPM system;
marking a second DPM feature on a second part; and
illuminating the second part with the visible illumination signal to indicate an occurrence of at least two of the second events in response to identifying the second events.

15. The method according to claim 12, further comprising illuminating the part with the visible illumination signal with a second wavelength if a determination is made that the DPM feature marked on the part has a quality below the minimum quality threshold.

16. The method according to claim 12, further comprising:
determining whether the part is in position to be marked; and
generating the visible illumination signal to illuminate the part in response to determining that the part is in a position to be marked.

17. The method according to claim 12, further comprising:
determining whether marking of the part is completed; and
generating a second visible illumination signal to illuminate the part in response to determining that the marking of the part is complete,
otherwise, generating a third visible illumination signal having a different wavelength than the second visible illumination signal or not generating the second or a third visible illumination signal.

18. A method for performing direct part marking (DPM), comprising:
identifying an event performed by a DPM system;
marking a DPM feature on a part;
illuminating the part with a visible illumination signal to indicate an occurrence of the event in response to identifying the event;

capturing an image of the DPM feature;
determining that the image of the DPM feature was correctly marked and read; and
illuminating the part with the illumination signal that is indicative of the DPM feature having been correctly marked and read.

\* \* \* \* \*